W. B. GELATT.
CORN HARVESTER.
APPLICATION FILED FEB. 19, 1918.
1,328,791.
Patented Jan. 20, 1920.
4 SHEETS—SHEET 3.
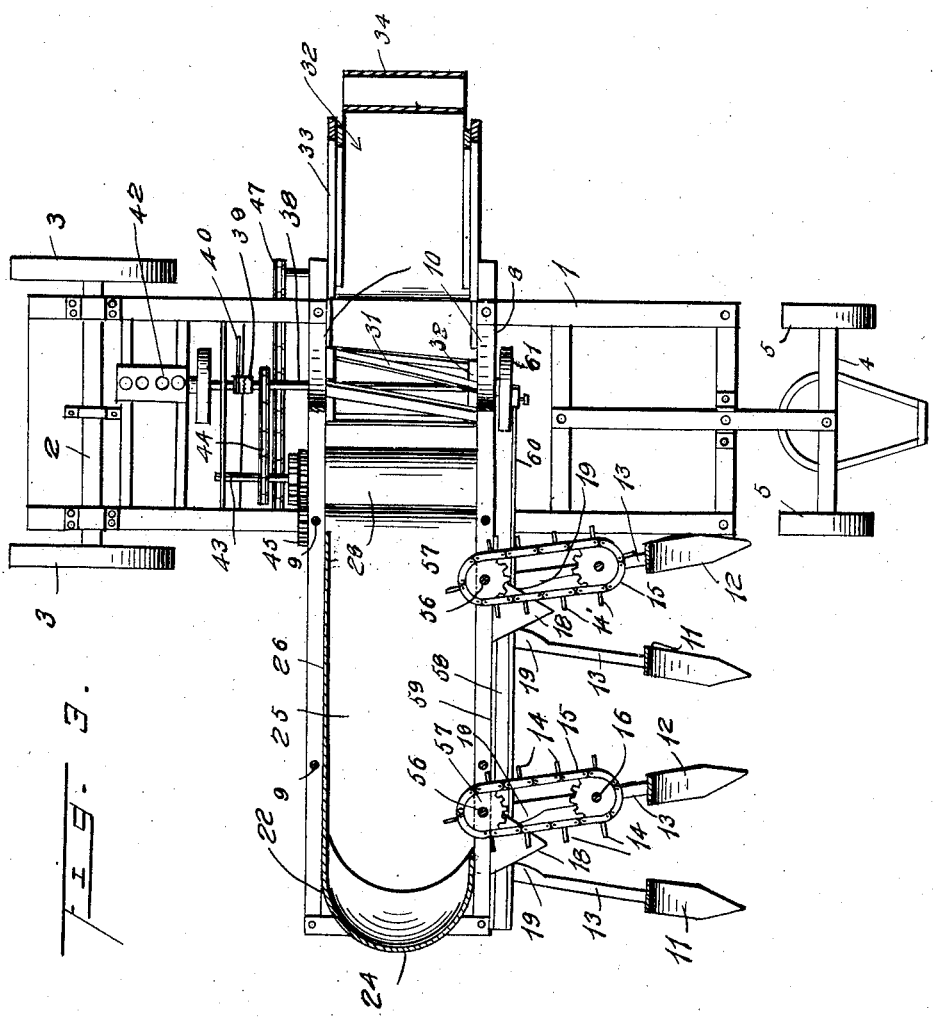
Witnesses
Inventor
W. B. Gelatt.
By
Attorney

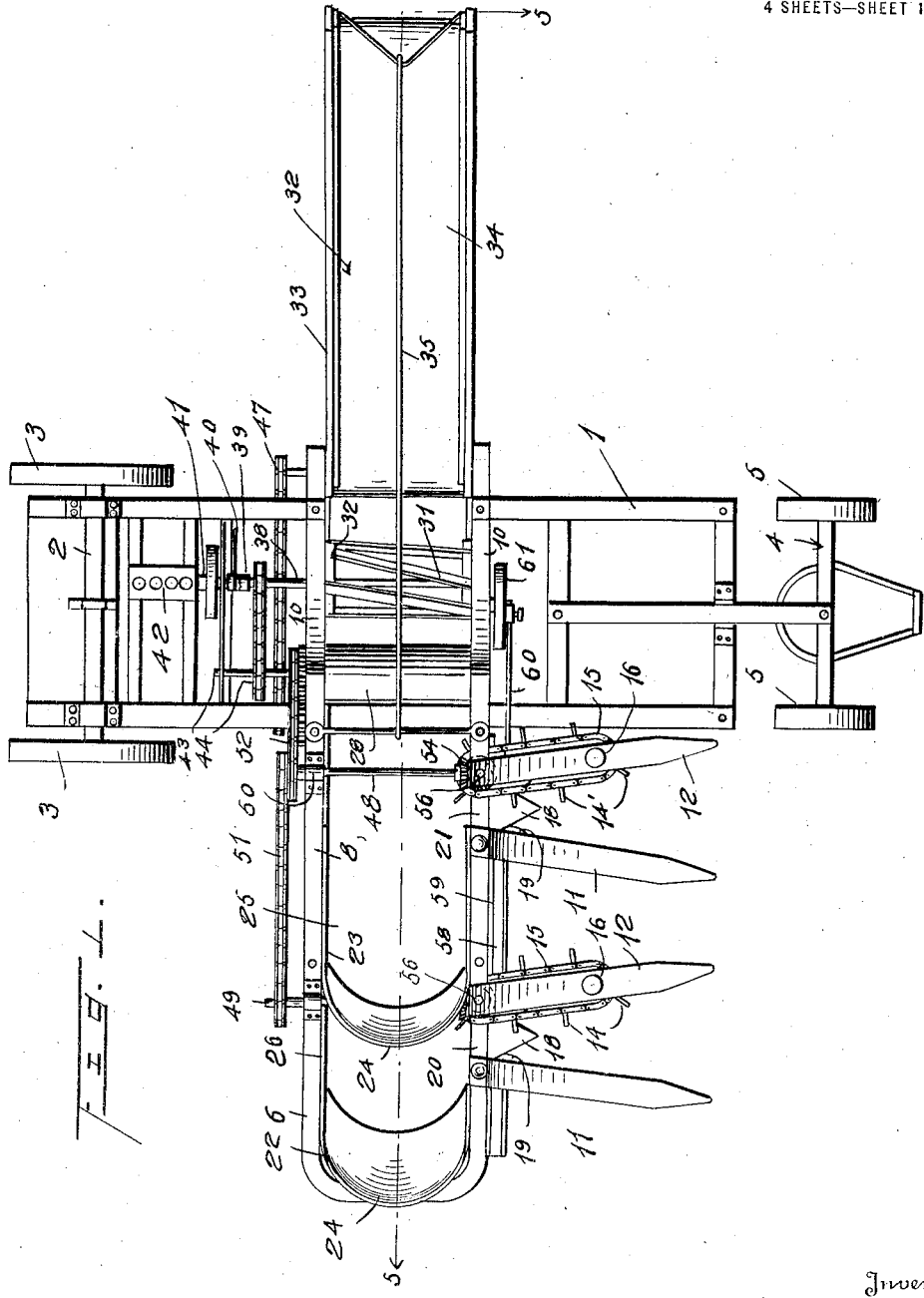

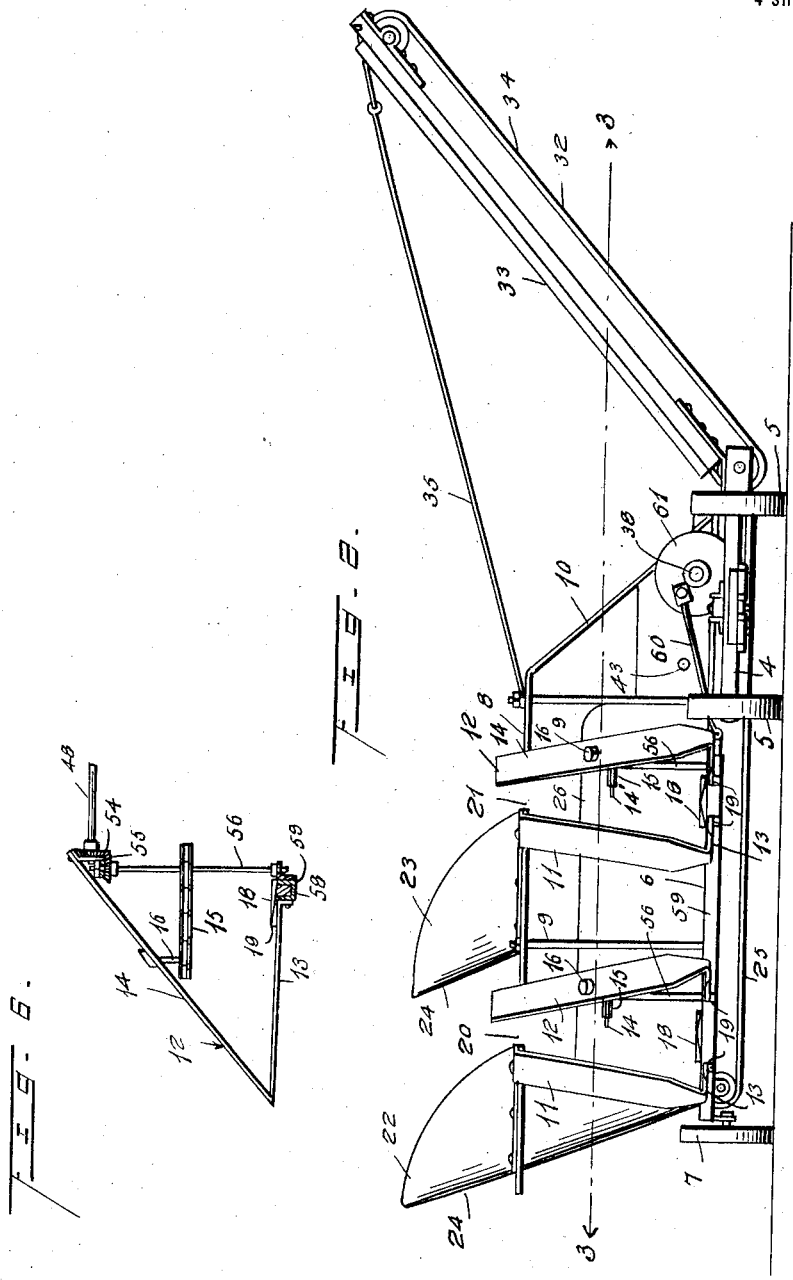

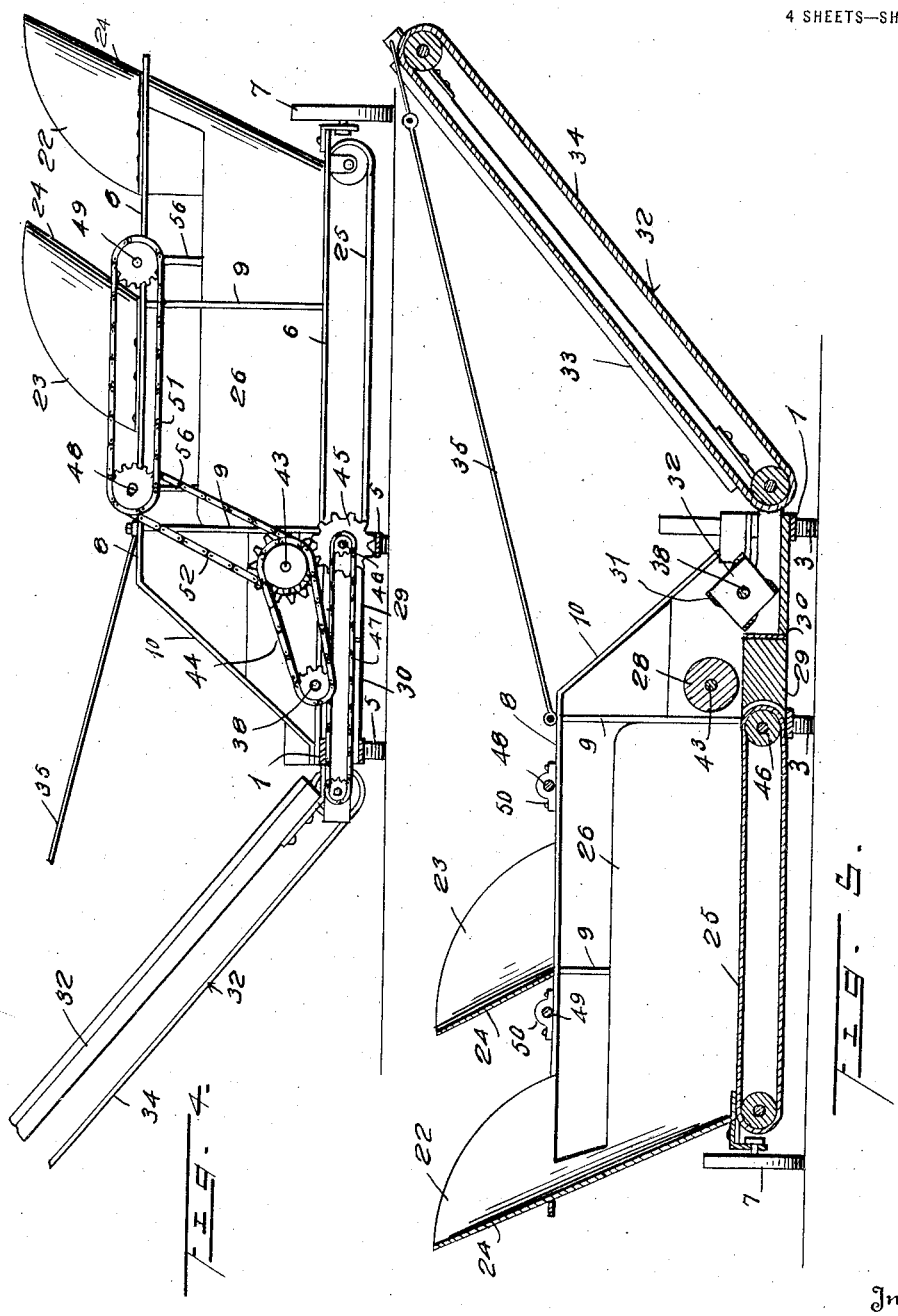

UNITED STATES PATENT OFFICE.

WALTER B. GELATT, OF SEYMOUR, IOWA.

CORN-HARVESTER.

1,328,791.  Specification of Letters Patent.  Patented Jan. 20, 1920.

Application filed February 19, 1918. Serial No. 218,103.

*To all whom it may concern:*

Be it known that I, WALTER B. GELATT, a citizen of the United States, residing at Seymour, in the county of Wayne and State of Iowa, have invented certain new and useful Improvements in Corn-Harvesters; and I do hereby declare the following to be a full, clear, and exact description of the invention, such as will enable others skilled in the art to which it appertains to make and use the same.

This invention relates to corn harvesters, and the primary object of the invention is to provide a corn harvester constructed for harvesting or cutting ensilage corn in a field, and cutting or chopping the corn into ensilage, which latter is delivered to a wagon bed or suitable portable receptacle by an elevator structure.

Another object of this invention is to provide a corn harvester as specified which includes a plurality of corn stalk guiding members arranged to engage the stalks in two rows of corn at the same time and guide the stalks to a reciprocatory cutter bar, which cuts the stalks delivering them within a pair of stalk supporting members which support the stalks in upright position so that the conveyer which travels beneath the lower ends of the stalk supporting members will engage the butt ends of the stalks and feed the butt ends forwardly to a guiding roller which will grip the stalks and guide them to the rotary cutting knife, which cutting knife will cut the corn stalks into ensilage which will be received by an elevator for deposit into a wagon or suitable receptacle.

With the foregoing and other objects in view this invention consists in such novel features of construction, combination and arrangement of parts as will be hereinafter more fully described illustrated in the accompanying drawings and claimed.

In describing the invention in detail, reference will be had to the accompanying drawings wherein like characters designate like and corresponding parts throughout the several views and in which:

Figure 1 is a top plan of the improved harvester

Fig. 2 is a front elevation of the harvester

Fig. 3 is a horizontal section through the harvester taken on the line 3—3 of Fig. 2

Fig. 4 is a rear elevation of the harvester

Fig. 5 is a longitudinal section through the harvester taken on the line 5—5 of Fig. 1 and Fig. 6 is a fragmentary vertical section through the harvester showing the corn stalk feeding means and the reciprocatory cutter bar for cutting the stalks.

Referring more particularly to the drawings, 1 designates the main supporting structure of the harvester, which supports a rear axle 2 upon which are mounted supporting wheels 3. A forward truck structure 4 is carried by the supporting frame 1 and it includes supporting wheels 5 which support the forward end of the supporting frame.

A second supporting frame 6 is attached to the supporting frame 1 substantially intermediate the ends of the latter, and extends transversally thereto, having a supporting wheel 7 carried by its outer end. The transversally extending supporting frame 6 has a superstructure 8 attached thereto and supported by suitable supports 9 and 10. Two pairs of corn stalk guiding members 11 and 12 are attached to the supporting structure 6 and they comprise horizontally extending base portions 13 and upwardly inclining portions 14. Each pair of the corn guiding members 11 and 12 is arranged for engaging a row of growing corn stalks therebetween so that two rows of stalks will be harvested by the harvester upon each trip across a field. The corn stalks are first engaged by and between each pair of the members 11 and 12 and after these members have moved a comparatively short distance along the stalks, the stalks are engaged by flights 14 which are carried by sprocket chains 15. The sprocket chains 15 travel in horizontal paths and their outer ends are supported by shafts 16 which are carried by the upwardly inclining portions of the guides 12. The flights 14' engage the corn stalks and force them against reciprocatory cutting knives 18 which coact with stationary knives 19 carried by the lower horizontal portion of the members 11 and 12, for cutting the stalks. The upper ends of the guiding members 12 project upwardly and rearwardly beyond the upper ends of members 11 and they guide the stalks which have been cut by the knives 18 and 19 through spaces 20 and 21 respectively into corn stalk supporting members 22 and 23. The corn stalk supporting members 22 and 23 have their rear walls 24 slightly inclined and these members are arranged for receiving the corn stalks from the guides 11 and 12 and holding them in upright position so that the butt ends of the stalks will be first engaged by a conveyer 25 which travels beneath the lower ends of the members 22 and 23. Member 23 is much shorter than the member 22, in that it is positioned forwardly of the member 22, with respect to the direction of travel of the conveyer 25 and the corn stalks which are received by the member 22 must be carried beneath the member 23. This construction is shown clearly in Fig. 5 of the drawings. The rear wall 24 of the member 22 is extended, as at 26, to prevent the stalks from being thrown off the rear end of the machine.

The conveyer 25 travels transversely to the direction of travel of the corn harvester, and carries the corn stalks, butts first to a feeding roller 28. The feeding roller 28 is positioned above a block 29, which has a stationary knife 30 carried by its outer end. The feeding roller 28 engages the corn stalks and feeds them forwardly so that they will be engaged by the knives 31 of a rotary cutter structure 32. The cutter structure 32, coacting with the stationary knife 30 will cut the corn stalks into ensilage which ensilage is received by an elevator structure 32 for deposit in a wagon or other suitable receptacle. The elevator structure 32 comprises a supporting structure 33 and an endless belt 34. The supporting structure 33 is pivotally connected to the main supporting structure 1 and a suitable brace rod 35 is attached to the supporting structure 33 and to the supersupporting structure 8 as clearly shown in Figs. 1 and 5 of the drawings.

The rotary cutter 32 is mounted upon a shaft 38, which shaft is connected, through a clutch mechanism 39 which is controlled by a lever 40, with the drive shaft 41 of an engine or prime mover 42, of any ordinary or suitable construction. The feeding roller 28 is mounted upon a shaft 43 which is operatively connected to the shaft 38 by a sprocket and chain connection 44. The conveyer structure 25 is operated from the shaft 43 by gears 45 and the elevator structure 32 is operated from the shaft 46 which operates the conveyer structure 25 by a sprocket and chain connection 47.

A pair of shafts 48 and 49 are rotatably supported in suitable bearings 50 carried by the superstructure 8, and these shafts are connected by a sprocket and chain connection 51. The shaft 48 is connected to the shaft 43 by a sprocket and chain connection 52, as clearly shown in Fig. 4 of the drawings. The shafts 48 and 49 extend forwardly across the superstructure 8, and have beveled gears 54 mounted upon their forward ends. Their beveled gears 54 mesh with beveled gears 55 carried by vertical shafts 56. The shafts 56 support sprockets 57, about which the sprocket chains 15 travel for operating the sprocket chains to force the corn stalks against the reciprocatory cutting blades 18.

The reciprocatory cutting blades 18 are carried by a sickle bar 58, which is slidably supported by a suitable guiding structure 59. A pitman 60 is connected to the bar 58 and it is eccentrically connected to a disk 61 which disk is mounted upon the shaft 38.

Summing up; generally the operation of the improved corn harvester is as follows:

The harvester is propelled over a field of standing corn, and the stalks are guided between the pairs of stalk guides 11 and 12, being engaged by the flights 14 of the sprocket chain structures 15 against the knives 18 and 19, which will sever the stalks. The cut stalks will be guided into the members 22 and 23, which will support the stalks in upright position until the butt ends of the stalks are engaged by the conveyer 25 which will feed the stalks butts first, to the feeding roller 28. The roller 28 will feed the stalks to the rotary cutter structure 32 which will cut the stalks into small particles or ensilage. The ensilage is delivered from the harvester, by the elevator structure 32 into any suitable receptacle such as a wagon bed or the like for transportation to a silo or any other suitable storage place.

As will be noted more clearly from Fig. 1, the elevator structure 32 is disposed at the opposite side of the main supporting frame 1 to the supplemental frame 8, and in direct alinement with this supplemental frame. The elevator structure thus acts as a counterbalance for the supplemental frame and the parts associated therewith, the supplemental frame and the mechanisms carried thereby serving to prevent lateral swaying or tilting of the main frame by the elevator. This insures proper balancing of the harvester and accuracy of operation thereof.

The operation of all of the working parts of the corn harvester is controlled by the shifting of the clutch structure 39 so that when it is desired to transport the harvester to or from a field, the various operating mechanisms of the harvester may be held from operation by shifting the clutch structure 39 into inoperative position.

From the foregoing description taken in connection with the accompanying drawings the advantages of construction and the method of operation of the improved corn harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a corn harvester, a portable frame, inner and outer pairs of forwardly directed stalk guiding members carried thereby, the members of each pair being spaced apart to pass on opposite sides of a row of stalks during advancement of the harvester, stalk cutting means associated with each pair of guiding members, a horizontal stalk conveyer disposed transversely of the frame adjacent the rearward ends of said pairs of stalk guiding members, means carried by each pair of guiding members for feeding cut stalks onto the upper run of the conveyer in substantial vertical position, ensilage cutting means positioned to receive stalks from the conveyer, an outer stalk receiving member positioned above the conveyer and positioned to receive stalks from the outer pair of said stalk guiding and cutting members, said stalk receiving member being transversely arched outwardly so as to urge the stalks toward the central portion of the upper run of the conveyer, and a similar inner receiving member positioned to receive stalks from the inner pair of stalk guiding members, said inner receiving member having its lower end positioned above the lower end of the outer receiving member so as to permit passage of stalks carried by the conveyer, the inner receiving member preventing interference with stalks discharged from said outer guiding members by stalks discharged from the inner guiding members and insuring that the stalks received from said inner guiding members will be deposited upon the conveyer during travel thereof with their butt ends in advance of the butt ends of the stalks received from the outer guiding members.

In testimony whereof I affix my signature in presence of two witnesses.

WALTER B. GELATT.

Witnesses:
George W. Clemens,
E. M. Jamison.